United States Patent
Aziz et al.

(10) Patent No.: US 8,379,711 B2
(45) Date of Patent: Feb. 19, 2013

(54) METHODS AND APPARATUS FOR DECISION-FEEDBACK EQUALIZATION WITH OVERSAMPLED PHASE DETECTOR

(75) Inventors: Pervez M. Aziz, Dallas, TX (US); Adam B. Healey, Newburyport, MA (US); Amaresh Malipatil, Milpitas, CA (US); Lizhi Zhong, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 847 days.

(21) Appl. No.: 12/495,547

(22) Filed: Jun. 30, 2009

(65) Prior Publication Data
US 2010/0329326 A1    Dec. 30, 2010

(51) Int. Cl.
  *H03H 7/30* (2006.01)
(52) U.S. Cl. ............... 375/233; 375/350; 375/355
(58) Field of Classification Search .......... 375/229, 375/230, 232, 233, 350, 354, 355; 708/300, 708/322, 323; 327/141, 146, 150, 155, 159
See application file for complete search history.

(56) References Cited

U.S. PATENT DOCUMENTS

| | | | |
|---|---|---|---|
| 7,277,516 B2 * | 10/2007 | Chou et al. | 375/350 |
| 7,801,208 B2 * | 9/2010 | Hidaka | 375/229 |
| 2010/0104000 A1 * | 4/2010 | Pozzoni | 375/233 |
| 2010/0215091 A1 * | 8/2010 | Palmer | 375/232 |

* cited by examiner

*Primary Examiner* — Dac Ha
(74) *Attorney, Agent, or Firm* — Ryan, Mason & Lewis, LLP

(57) ABSTRACT

Methods and apparatus are provided for decision-feedback equalization with an oversampled phase detector. A method is provided for detecting data in a receiver employing decision-feedback equalization. A received signal is sampled using a data clock and a transition clock to generate a data sample signal and a transition sample signal. A DFE correction is obtained for each of the data sample and transition sample signals to generate DFE detected data and DFE transition data. One or more coefficients used for the DFE correction for the transition sample signals are adapted using the DFE transition data.

22 Claims, 10 Drawing Sheets

*FIG. 2*

| v(n−1) | v(n−1/2) | v(n) | PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

METHODS AND APPARATUS FOR DECISION-FEEDBACK EQUALIZATION WITH OVERSAMPLED PHASE DETECTOR

CROSS-REFERENCE TO RELATED APPLICATIONS

The present application is related to U.S. patent application Ser. No. 11/540,946, filed Sep. 29, 2006, entitled "Method and Apparatus for Determining Latch Position for Decision-Feedback Equalization Using Single-Sided Eye," U.S. patent application Ser. No. 11/686,148, filed Mar. 14, 2007, entitled "Method and Apparatus for Decision-Feedback Equalization Using Single-Sided Eye with Global Minimum Convergence," and U.S. patent application Ser. No. 11/864,110, filed Sep. 28, 2007, entitled "Method and Apparatus for Determining Threshold of One or More DFE Transition Latches Based on Incoming Data Eye," each incorporated by reference herein.

FIELD OF THE INVENTION

The present invention relates generally to decision-feedback equalization techniques, and more particularly, to decision-feedback equalization techniques that employ oversampled phase detectors.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers must jointly equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction, v(t), is subtracted in a feedback fashion to produce a DFE corrected signal w(t). The same clock, generated from the received signal by a clock and data recovery (CDR) circuit, is generally used to sample the incoming signal and for the DFE operation.

A number of techniques exist for clock and data recovery for DFE. Nonetheless, a need still exists for methods and apparatus for generating additional samples/decisions (other than the main data sample/decision) to allow CDR for DFE equalized signals, as well as adpatation of parameters which generate these additional samples. Yet another need exists for methods and apparatus for properly sampling a multi-tap DFE equalized signal with a bang-bang phase detector or a quasi-linear phase detector-based CDR loop.

SUMMARY OF THE INVENTION

Generally, methods and apparatus are provided for decision-feedback equalization with an oversampled phase detector. According to one aspect of the invention, a method is provided for detecting data in a receiver employing decision-feedback equalization. A received signal is sampled using a data clock and a transition clock to generate a data sample signal and a transition sample signal. A DFE correction is obtained for each of the data sample and transition sample signals to generate DFE detected data and DFE transition data. One or more coefficients used for the DFE correction for the transition sample signals are adapted using the DFE transition data.

The adaptation may optionally comprise a precomputation for the DFE correction for the transition sample signals. Further, the adaptation may optionally be conditioned upon a data transition. The coefficients used for the DFE correction for the transition sample signals can be computed, for example, as a function of a prior value of the transition sample signals, for example, using one or more digital state machines. One or more parameters of the adapting step, such as an adaptation rate, may optionally be altered upon detection of a predefined pattern.

A more complete understanding of the present invention, as well as further features and advantages of the present invention, will be obtained by reference to the following detailed description and drawings.

BRIEF DESCRIPTION OF THE DRAWINGS

FIG. 2 is a table characterizing the input/output relationship of the BBPD of FIG. 1;

DETAILED DESCRIPTION

The present invention provides methods and apparatus for generating additional samples/decisions (other than the main data sample/decision) to allow CDR for DFE equalized signals, as well as adaptation of parameters which generate these additional samples. According to one aspect of the present invention, loop unrolling is employed for the data samples, as well as for additional samples used by oversampled phase detectors, such as transition, early and late samples. Raw samples clocked by the transition, early and late clock are processed using decision feedback with unrolling to produce the corresponding DFE equalized transition, early and late samples (and optionally additional samples).

According to another aspect of the present invention, an algorithm is provided for updating the transition, early, late or other coefficients that are employed for DFE equalization. While the exemplary embodiments focus on DFE architectures where the data portion is not a standard analog feedback loop but a hybrid loop employing analog feedback as well as "pre-computation" or "unrolling" techniques, the present invention could be used with fully unrolled, fully analog feedback, or hybrid architectures, as would be apparent to a person of ordinary skill in the art.

Figure 1:
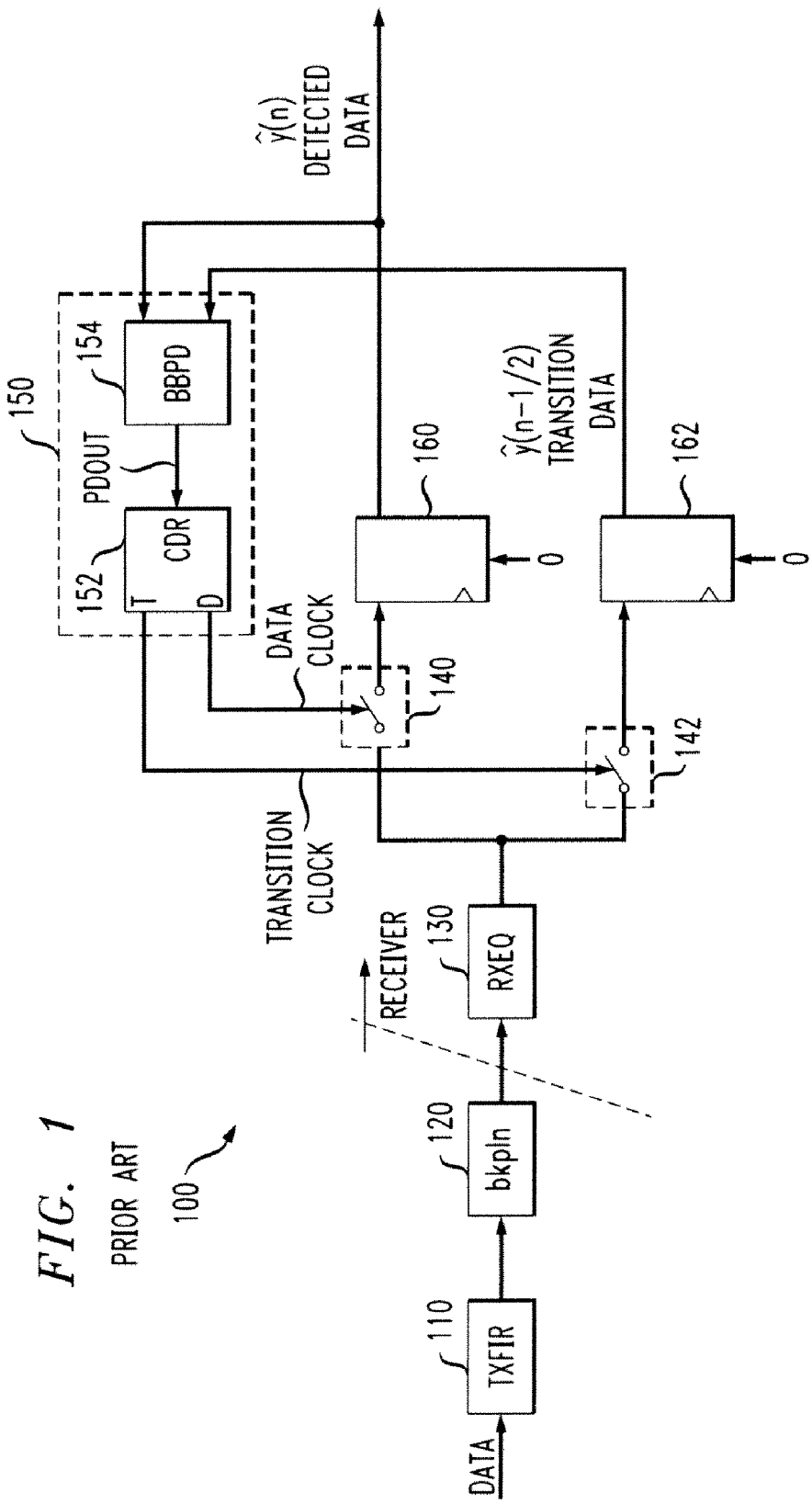
FIG. 1 is a block diagram of a conventional serializer/deserializer communication channel having a channel impairment.

FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TXFIR) 110. After passing through the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, ŷ(n), of the slicer 160 is given as follows:

$$\hat{y}(n) = 1 \text{ if } w(n) > s_t \quad (1)$$
$$= 0 \text{ otherwise}$$

In general, the CDR 150 may be composed of several components, such as a phase detector (PD), a loop filter, and a clock generation circuit. As shown in FIG. 1, the exemplary CDR 150 is comprised of a loop filter 152 embodied as a digital loop filter (CDR loop filter and clock generation) and a phase detector 154 embodied as a bang-bang phase detector (BBPD). For a discussion of bang-bang phase detector, see, for example, J. D. H. Alexander, "Clock Recovery from Random Binary Signals," Electronics Letters, 541-42 (October, 1975), incorporated by reference herein.

The BBPD 154 processes several quantities to compute an estimate of timing adjustment needed to properly sample the signal, in a known manner. The timing adjustment is filtered by the loop 152 before adjusting the phase of the sampling clocks. For the BBPD 154, there needs to be two sampling clocks: a data sampling clock which samples the recovered data and a transition sampling clock that is offset from the data clock by half a baud period $$\frac{T}{2}$$

and which samples the "transition" data. The transition sample data is denoted as ŷ(n−½) to indicate is sampled relative to ŷ(n) by a phase offset of $$\frac{T}{2}.$$

In addition, the BBPD 154 makes use of a one baud period delayed version of the recovered data. The delayed data is ŷ(n−1) (not shown explicitly in FIG. 1). Generally, the delayed data, ŷ(n−1) can be created internally by the BBPD 154 from ŷ(n). The BBPD input/output relationship is characterized by the look up table 200 shown in FIG. 2. Since the BBPD 154 requires more than one sample per baud period, the BBPD 154 is classified as an oversampled phase detector.

DFE Background

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 3:
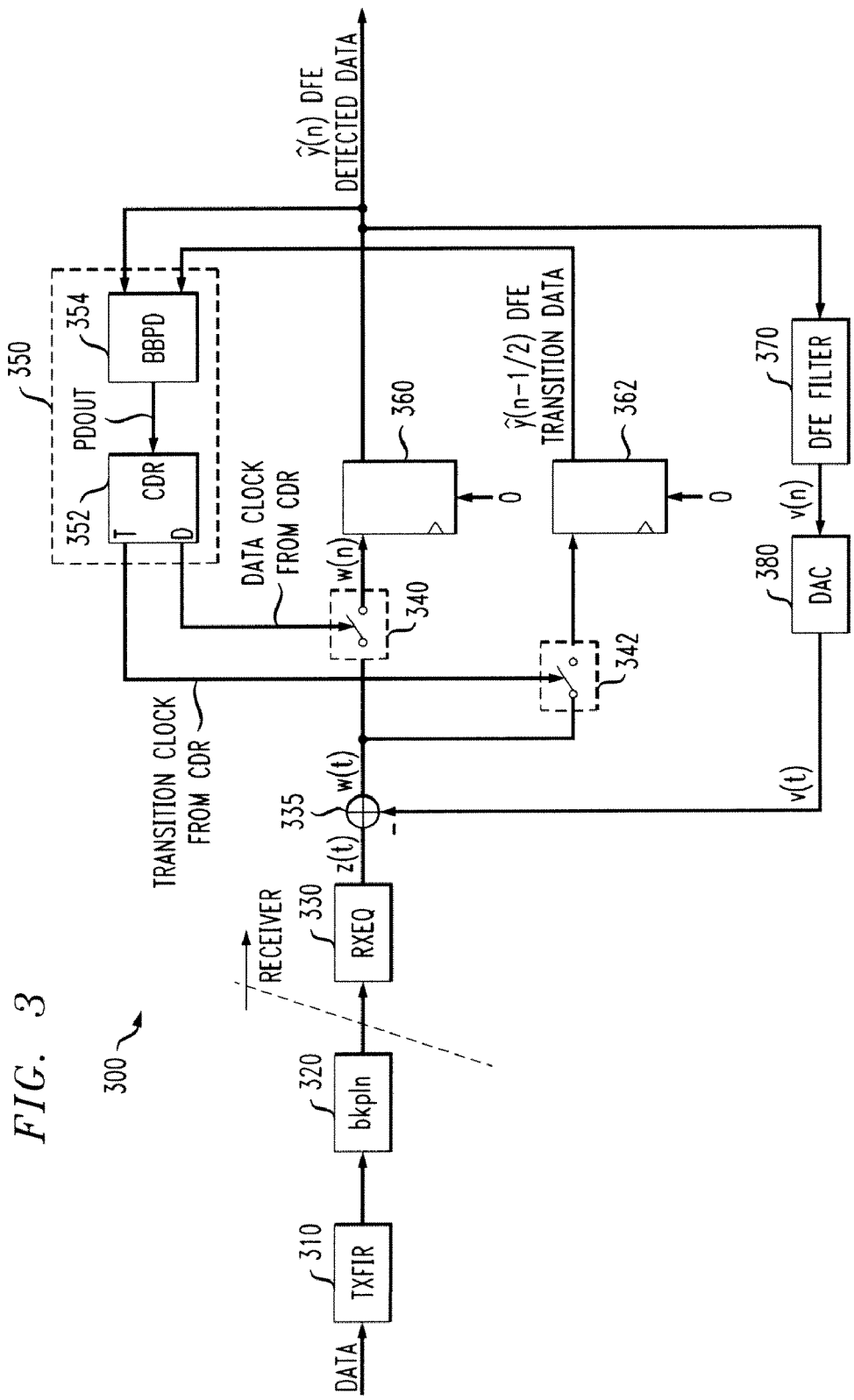
FIG. 3 is a block diagram of a serializer/deserializer communication channel incorporating a traditional DFE based equalizer.

FIG. 3 is a block diagram of a serializer/deserializer communication channel 300 that incorporates a traditional DFE based equalizer in addition to the TX and RX equalization of FIG. 1. As shown in FIG. 3, the data is transmitted through a backplane channel 320 after optionally being equalized or filtered through a transmit FIR filter (TXFIR) 310. After passing through the backplane 320, the analog signal may optionally be filtered or equalized by a receive equalizer (RXEQ) 330 which may consist, for example, of a continuous time filter. The analog signal out of the RXEQ 330 is sampled at the baud rate by a switch 340 using a sampling clock generated by a clock/data recovery (CDR) circuit 352, in a similar manner to FIG. 1.

As discussed hereinafter, a DFE correction, v(t), generated by a DFE filter 370 and digitized by a digital-to-analog converter 380 is subtracted by an analog summer 335 from the output, z(t), of the RXEQ 330 to produce a DFE corrected signal w(t).

$$w(t) = z(t) - v(t) \quad (2)$$

Then, the signal w(t) is sampled by a switch 340:

$$w(n) = w(nT) \quad (3)$$

with T being the baud period. The sampled signal w(n) is then sliced by a slicer 360 to produce the detected data ŷ(n). The slicer output in turn is used to produce the filtered DFE output v(n) which is converted by the DAC 380 to the continuous time signal v(t). The DFE filter output 380 is given by:

$$v(n) = \sum_{l=1}^{L} b(l)\hat{y}(n-l) \quad (4)$$

where b(l) represents the coefficients of the L tap DFE.

As discussed above in conjunction with FIG. 1, the BBPD 354 requires two sampling clocks: a data sampling clock which samples the recovered data and a transition sampling clock that is offset from the data clock by half a baud period $$\frac{T}{2}$$

and which samples the "transition" data. The analog signal out of the RXEQ 330 is sampled at the baud rate by a switch 342 using the transition clock. The sampled signal w(n) is also sliced by a second slicer 362 to produce the detected data ŷ(n−½). The transition sample data is denoted as ŷ(n−½) to indicate is sampled relative to ŷ(n) by a phase offset of $$\frac{T}{2}.$$

It is noted that the DFE filter 370 uses as its input past data decisions starting at y(n−1) and earlier. The DFE filter 370 does not use the current decision ŷ(n). This guarantees that the operation is causal. Since an analog representation, w(t), of the DFE signal exists, it can be sampled directly by both the data clock using switch 340 (to produce w(n)) and the transition clock using switch 342 and these sampled latched signals can drive a traditional BBPD 354. For this circuit 300 to work, the entire DFE loop correction must be performed within one baud period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(n). Since there is no DFE feedback loop, the process of generating the DFE "corrected" decisions can be pipelined.

Figure 4:
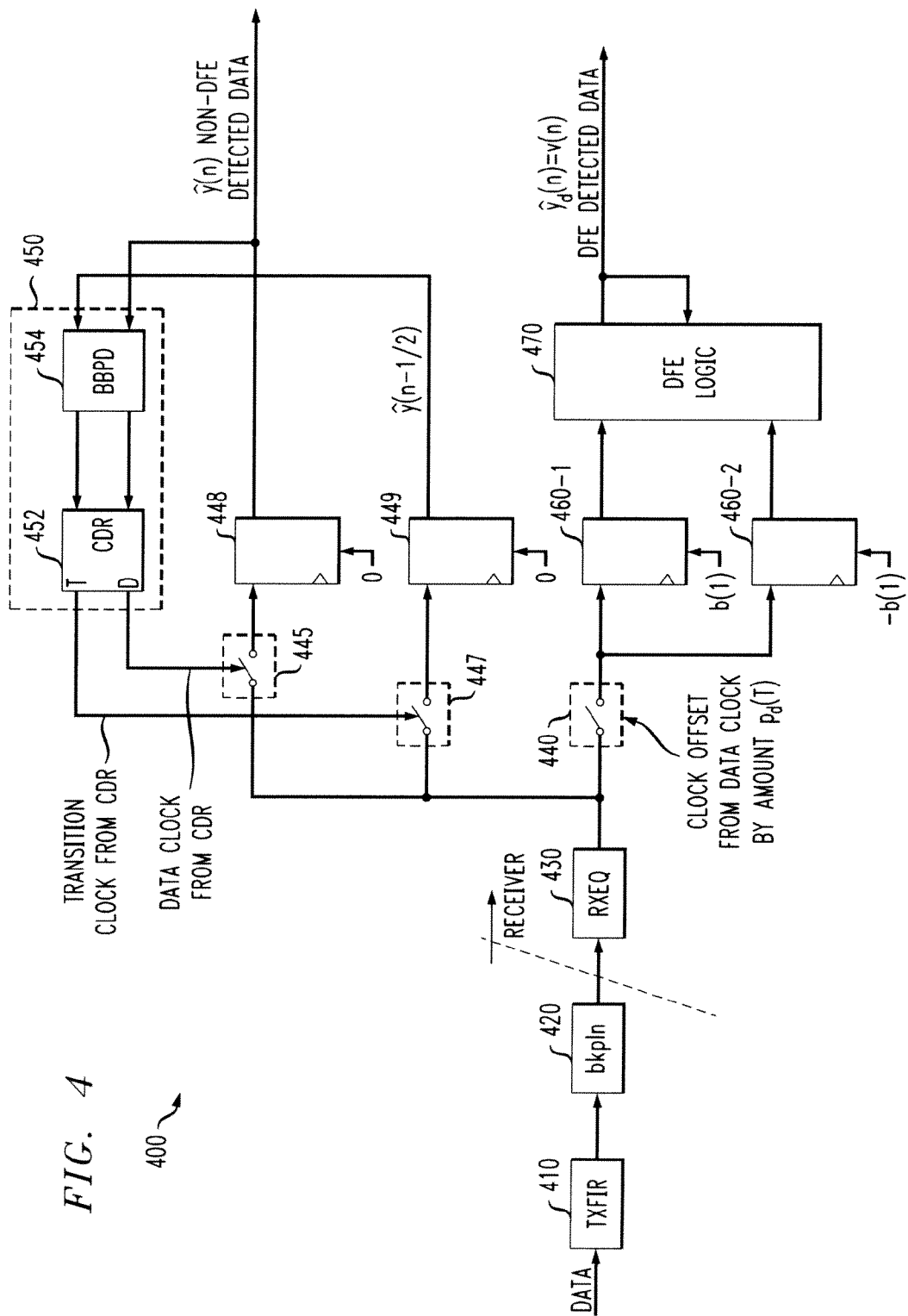
FIG. 4 is a block diagram of a serializer/deserializer communication channel that incorporates precomputation of the DFE terms.

FIG. 4 is a block diagram of a serializer/deserializer communication channel 400 that incorporates precomputation of the DFE terms, in addition to the TX and RX equalization of FIGS. 1 and 3. The exemplary embodiment shown in FIG. 4 is for a one tap (L=1) DFE that makes use of a DFE coefficient b(1). For simplicity of notation, b(1) is denoted by the variable c.

As shown in FIG. 4, the data is transmitted through a backplane channel 420 after optionally being equalized or filtered through a transmit FIR filter (TXFIR) 410. After passing through the backplane 420, the analog signal may optionally be filtered or equalized by a receive equalizer (RXEQ) 430. The analog output of the RXEQ 430 is sampled at the baud rate by switches 440, 445, 447. The switch 445 uses a data clock generated by the clock data recovery circuit 452 and switch 447 uses a transition clock generated by the clock/data recovery circuit 452, in a similar manner to FIG. 3. Latches 448, 449 having exemplary thresholds of 0 are used to generate a decision from the non-DFE equalized signal, in a similar manner to FIG. 3.

As shown in FIG. 4, exemplary latches 460-1 and 460-2 having thresholds of b(1) and −b(1), respectively, are used to generate a decision for the DFE equalized signal. The decisions from the DFE slicer latches 460 are combined by the DFE logic 470 with the previous DFE detected bit decision, ŷ$_d$(n−1) (represented in FIG. 4 by the arrow fed back into the DFE logic block 470) to produce the final DFE corrected decision ŷ$_d$(n). The DFE path computation logic can be pipelined thereby eliminating the bottleneck of having to complete the computation in one baud period. The DFE logic 470 selects from the pre-computed decisions, which are the outputs of the latches 460 with thresholds b(1) and −b(1), based on the past decision ŷ$_d$(n−1).

For the case when ŷ$_d$(n−1)=1, $$\hat{y}_d(n) = 1 \text{ if } y(n) > b(1) \quad (5)$$

$$= 0 \text{ if } y(n) < b(1) \quad (6)$$

For the case when ŷ$_d$(n−1)=−1, $$\hat{y}_d(n) = 1 \text{ if } y(n) > -b(1) \quad (7)$$

$$= 0 \text{ if } y(n) < -b(1) \quad (8)$$

The outputs of the latches 460 are applied to DFE logic 470 to generate the DFE corrected decision ŷ$_d$(n).

The DFE and non-DFE decision operations may have different optimal sampling points. Therefore, the DFE latches should be sampled with a correct sampling phase that may be offset from the normal CDR data clock sampling phase by some offset p$_d$ in units of baud interval T. Thus, the switch 440 in the DFE path is controlled by a clock that is offset from the CDR data clock by an amount equal to p$_d$(T). A number of techniques have been proposed or suggested for manually establishing the offset p$_d$(T). The optimal sampling phase, however, is dependent on the channel or other equalizer settings. Thus, the sampling phase can be adaptively determined using the techniques described in United States Patent Application entitled "Method and Apparatus for Adaptively Establishing a Sampling Phase for Decision-Feedback Equalization," filed Feb. 17, 2006, and incorporated by reference herein.

It is noted that the DFE can extended to more than one tap at the expense of additional area and computation time. The exemplary DFE phase placement circuit presented herein can be extended to a system with multiple DFE taps without changing the DFE phase placement circuit. For additional taps, the number of latches and the DFE logic block would be modified, as would be apparent to a person of ordinary skill in the art.

In the DFE precomputation embodiment shown in FIG. 4, the DFE correction is not fed back to correct the output of the RXEQ 430 and the BBPD 454 is thus controlled by non-DFE detected data ŷ(n) and ŷ(n−½). Thus, the BBPD 154, 354, 454 is processing data ŷ(n) and ŷ(n−½) containing channel impairments. Methods and apparatus are employed for generating one or more clock signals for a decision-feedback equalizer using DFE detected data.

Hybrid DFE Architectures: Analog Feedback And Loop Unrolling

Figure 5:
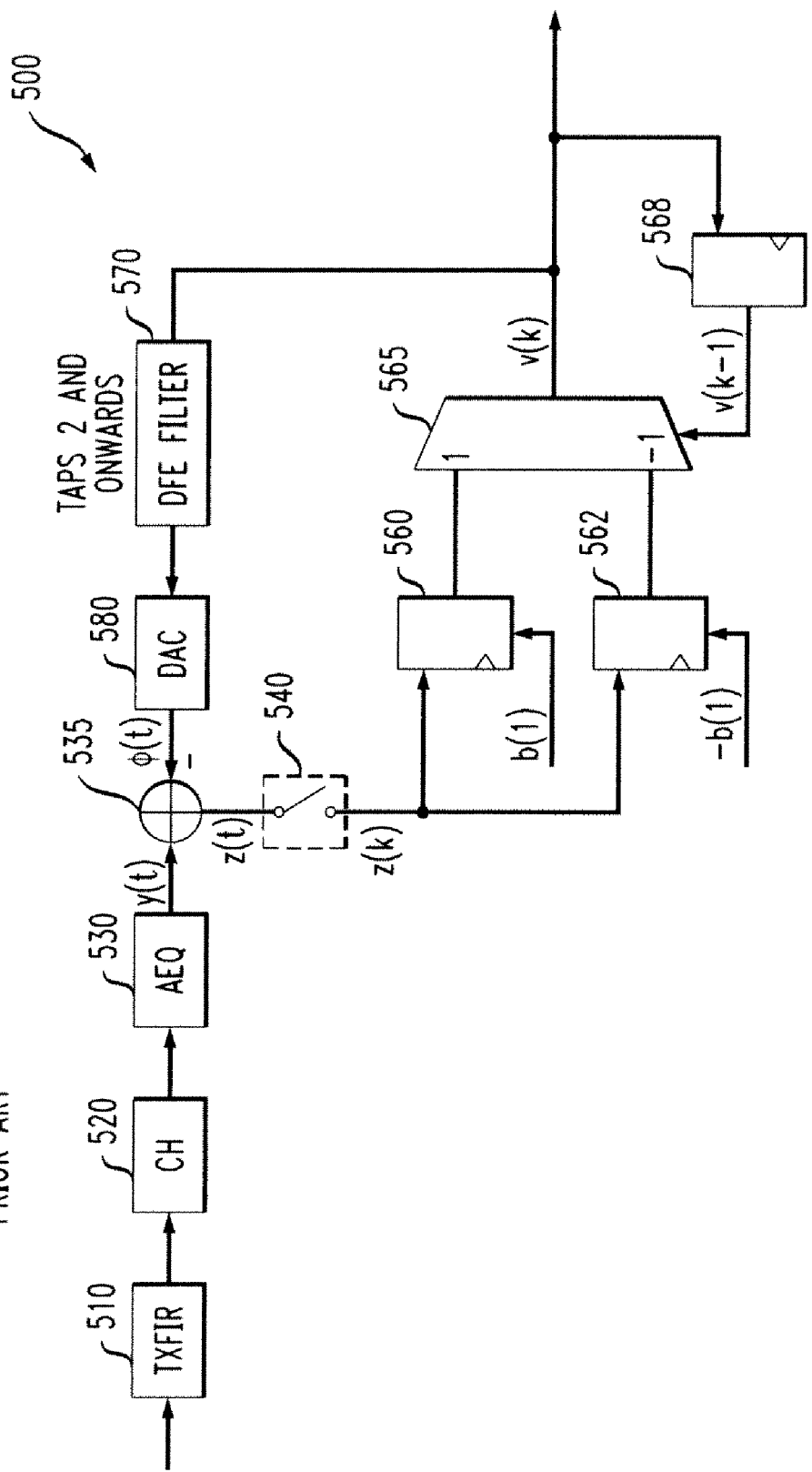
FIG. 5 is a block diagram of a serializer/deserializer communication channel that incorporates both analog feedback and loop unrolling for the data samples.

FIG. 5 is a block diagram of a serializer/deserializer communication channel 500 that incorporates both analog feedback and loop unrolling for the data samples. FIG. 5 illustrates an exemplary conventional hybrid DFE architecture 500 that employs analog feedback and loop unrolling. As shown in FIG. 5, the data is transmitted through a channel 520 after optionally being equalized or filtered through a transmit FIR filter (TXFIR) 510. After passing through the channel 520, the analog signal may optionally be filtered or equalized by an equalizer (AEQ) 530 which may consist, for example, of a continuous time filter. The analog signal out of the AEQ 530 is sampled at the baud rate by a switch 540 using a sampling clock generated by a clock/data recovery (CDR) circuit (not shown), in a similar manner to FIG. 1.

As discussed hereinafter, a DFE correction, $\phi(t)$, generated by a DFE filter 570 and digitized by a digital-to-analog converter 580 is subtracted by an analog summer 535 from the output, y(t), of the AEQ 530 to produce a DFE corrected signal z(t).

$$z(t)=y(t)-\phi(t).$$

Here, taps 2 and higher (b(2) . . . ) are implemented using the analog feedback and the first tap, b(1), is realized using unrolled or precomputation based DFE.

Then, the signal z(t) is sampled by a switch 540:

$$z(k)=z(kT)$$

with T being the baud period. The sampled signal z(k) is then sliced by a slicer 560 and by a second slicer 562. The slicers 560, 562 digitize the sample and compare the digitized sample to thresholds of b(1) and −b(1), respectively, using the CDR recovered clock. The output of slicers 560, 562 are applied to respective inputs of a multiplexer 565 that produces the filtered DFE output v(k) which is converted by the DAC 580 to the continuous time signal $\phi(t)$. The output of multiplexer 565 is also sliced by a slicer 568, delayed and then fed back to provide the input selection for the multiplexer 565.

Unrolled One Tap Data and Transition DFE

Figure 6:
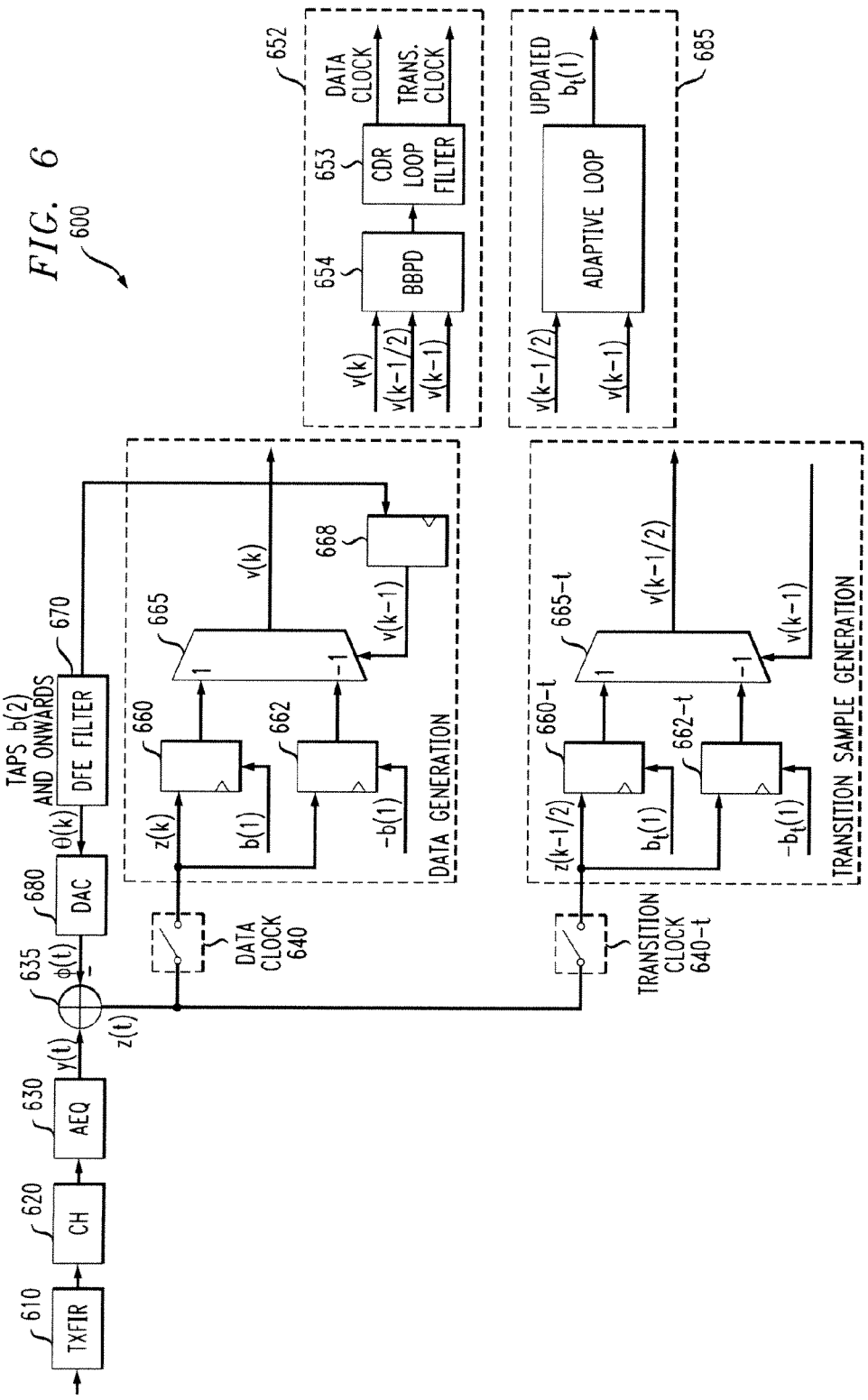
FIG. 6 illustrates a hybrid DFE architecture in accordance with the present invention that employs analog feedback and loop unrolling for both the data and transition samples.

FIG. 6 illustrates a hybrid DFE architecture 600 in accordance with the present invention that employs analog feedback and loop unrolling for both the data and transition samples. FIG. 6 thus provides transition sample generation and adaptation.

As shown in FIG. 6, the data is again transmitted through a channel 620 after optionally being equalized or filtered through a transmit FIR filter (TXFIR) 610. After passing through the channel 620, the analog signal may optionally be filtered or equalized by an equalizer (AEQ) 630 which may consist, for example, of a continuous time filter. The analog signal out of the AEQ 630 is sampled at the baud rate by a switch 640 using the data clock generated by a clock/data recovery (CDR) circuit 652. As shown in FIG. 6, the exemplary CDR 652 is comprised of a loop filter 653 embodied as a digital loop filter (CDR loop filter and clock generation) and a phase detector 654 embodied as a bang-bang phase detector (BBPD). The CDR 652 generates the data and transition clocks, discussed hereinafter.

As discussed hereinafter, a DFE correction, $\phi(t)$, generated by a DFE filter 670 and digitized by a digital-to-analog converter 680 is subtracted by an analog summer 635 from the output, y(t), of the AEQ 630 to produce a DFE corrected signal z(t).

$$z(t)=y(t)-\phi(t).$$

Here, taps 2 and higher (b(2) . . . ) for the data path are implemented using the analog feedback and the first tap, b(1) is realized using unrolled or precomputation based DFE.

Then, the signal z(t) is sampled by the switch 640, sampled by the data clock:

$$z(k)=z(kT)$$

with T being the baud period. It is noted that z(k) is used as a short hand notation for $z(kT+\tau)$. The sampled signal z(k) is then sliced by slicers 660 and 662 that digitize the sample and compare the digitized sample to thresholds of b(1) and −b(1), respectively, using the CDR recovered data clock. The output of slicers 660, 662 are applied to respective inputs of a multiplexer 665 that produces the filtered DFE output v(k) which is converted by the DAC 680 to the continuous time signal $\phi(t)$. The output of multiplexer 665 is also sliced by a slicer 668, delayed and then fed back to provide the input selection for the multiplexer 665.

As previously indicated, FIG. 6 provides a hybrid DFE architecture 600 with loop unrolling for both the data and transition samples. As shown in FIG. 6, the analog signal out of the AEQ 630, z(t), is also sampled at the baud rate by a switch 640-t using the transition clock generated by the clock data recovery (CDR) circuit 652.

The sampled transition signal z(k−½) is then sliced by slicers 660-t and 662-t that digitize the sample and compare the digitized sample to thresholds of $b_t(1)$ and $-b_t(1)$, respectively, using the CDR recovered transition clock. The output of slicers 660-t, 662-t are applied to respective inputs of a multiplexer 665-t that produces the filtered DFE output v(k−½). Thus, one tap $b_t(1)$ is used for the transition sample generation. In this case, a DFE transition signal is obtained, derived as $$v(k-\tfrac{1}{2})=\text{sgn}[z(k-\tfrac{1}{2})-b_t(1)v(k-1)] \quad (9)$$

This can be further simplified as $$\text{Transition: } v(k-1/2) = \begin{cases} \text{sgn}\left(z\left(kT+\tau-\tfrac{T}{2}\right)-b_t(1)\right) & \text{if } v(k-1)=1 \\ \text{sgn}\left(z\left(kT+\tau-\tfrac{T}{2}\right)+b_t(1)\right) & \text{if } v(k-1)=-1 \end{cases} \quad (10)$$

As shown in FIG. 6, an adaptive loop 685 generates the updated transition thresholds $b_t(1)$ based on the transition sample v(k−½) and prior data sample v(k−1). This is shown in FIG. 6, where z(k−½) is used as a short hand notation for $$z\left(kT+\tau-\tfrac{T}{2}\right),$$

which is the signal z(t) sampled by the transition clock. In general, a transition error signal e(k−½) can be derived from the transition signal v(k−½) as $$e(k-\tfrac{1}{2})=v(k-\tfrac{1}{2})-vid(k-\tfrac{1}{2}) \quad (11)$$

where vid(k−½) is the "ideal" signal for the transition. When v(k)≠v(k−1), indeed vid(k−½)=0 and then $$e(k-\tfrac{1}{2})=v(k-\tfrac{1}{2}) \quad (12)$$

An adaptation "gradient" which adapts a coefficient will typically use an error signal and some other data derived signal and in this case, the transition coefficient $b_t(1,k)$ can be adapted as follows:

$$b_t(1,(k+1)=b_t(1,k)-2\mu_t e(k-\tfrac{1}{2})v(k-1) \quad (13)$$

which reduces to:

$$b_t(1,(k+1)=b_t(1,k)-2\mu_t v(k-\tfrac{1}{2})v(k-1) \quad (14)$$

when $e(k-\tfrac{1}{2})=v(k-\tfrac{1}{2})$, where $\mu_t$ is an adaptation gain factor which can be set independent of any adaptation gain factor $\mu$ for the regular DFE taps b(j). The value of the transition tap at time k is $b_t(1,k)$ and it is updated per the above equation to obtain its value $b_t(1,k+1)$ at time k+1. The use of $b_t(1)$ has the impact of performing transition ISI cancellation on the first tap. Additional transition cancellation for higher order taps could be considered by considering more terms at the cost of additional complexity, power and area. For optimal performance, the adaptation may be conditioned upon a data transition, i.e.:

$$b_t(1,(k+1)=b_t(1,k)-2\mu_t v(k-\tfrac{1}{2})v(k-1) \text{ when } v(k)\neq v(k-1) \quad (15)$$

They may also be conditioned on other data that has been conditioned depending on the history of the data bits v(k) over some window of decisions spanning a finite length into the past.

Unrolled One Tap Data and Transition DFE Without Data Conditioning

Figure 7:
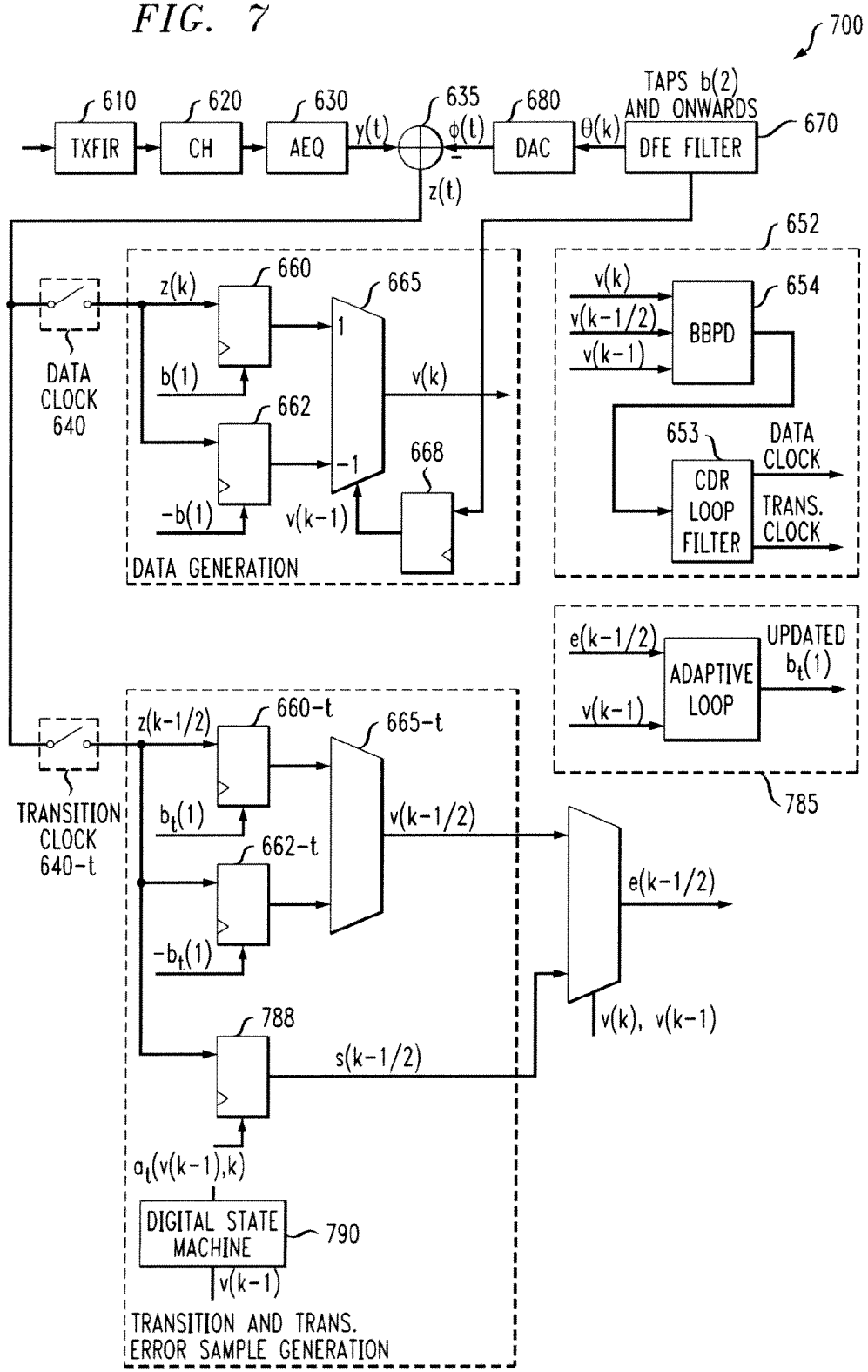
FIG. 7 illustrates a hybrid DFE architecture in accordance with the present invention that employs analog feedback and loop unrolling for both the data and transition samples, without requiring any data conditioning.

FIG. 7 illustrates a hybrid DFE architecture 700 in accordance with the present invention that employs analog feedback and loop unrolling for both the data and transition samples, without requiring any data conditioning. Rather, the implementation of FIG. 7 adapts on all the available data samples. It is noted that the like-numbered elements in FIG. 7 operate in a similar manner to the corresponding elements of FIG. 6. In the implementation of FIG. 7, the transition error sample $e(k-\tfrac{1}{2})$ is not simply the same as transition sample $v(k-\tfrac{1}{2})$ and must be modified appropriately for the case when $v(k)\neq v(k-1)$ in which case $vid(k-\tfrac{1}{2})$ is no longer zero but $\gamma v(k-1)$ where $\gamma$ is the nominal equalized signal value when $v(k)\neq v(k-1)$.

$$\text{Transition: } e(k-1/2) = \begin{cases} v(k-1/2) & \text{if } v(k) \neq v(k-1) \\ \text{sgn}(z(k-1/2) - b_t(1)v(k-1) - \gamma v(k-1)) & \text{if } v(k) = v(k-1) \end{cases} \quad (16)$$

As shown in FIG. 7, the hybrid DFE architecture 700 comprises a digital state machine 790 that sets the threshold of the lower latch 788 accordingly, depending on the value of v(k−1). The threshold, $\alpha_t$, of the lower latch 788 is set with $\alpha_t = b_t(1)+\gamma$ or $\alpha_t = -b_t(1)-\gamma$ depending on v(k−1). An adaptive loop 785 generates the updated transition thresholds $b_t(1)$ based on the error signal $e(k-\tfrac{1}{2})$ and prior data sample v(k−1) using equations (13) and (16) in the case of no data conditioning and equation (15) in the case of data conditioning.

Unrolled One Tap Data DFE and Two Tap Transition DFE (Data Conditioning)

Figure 8:
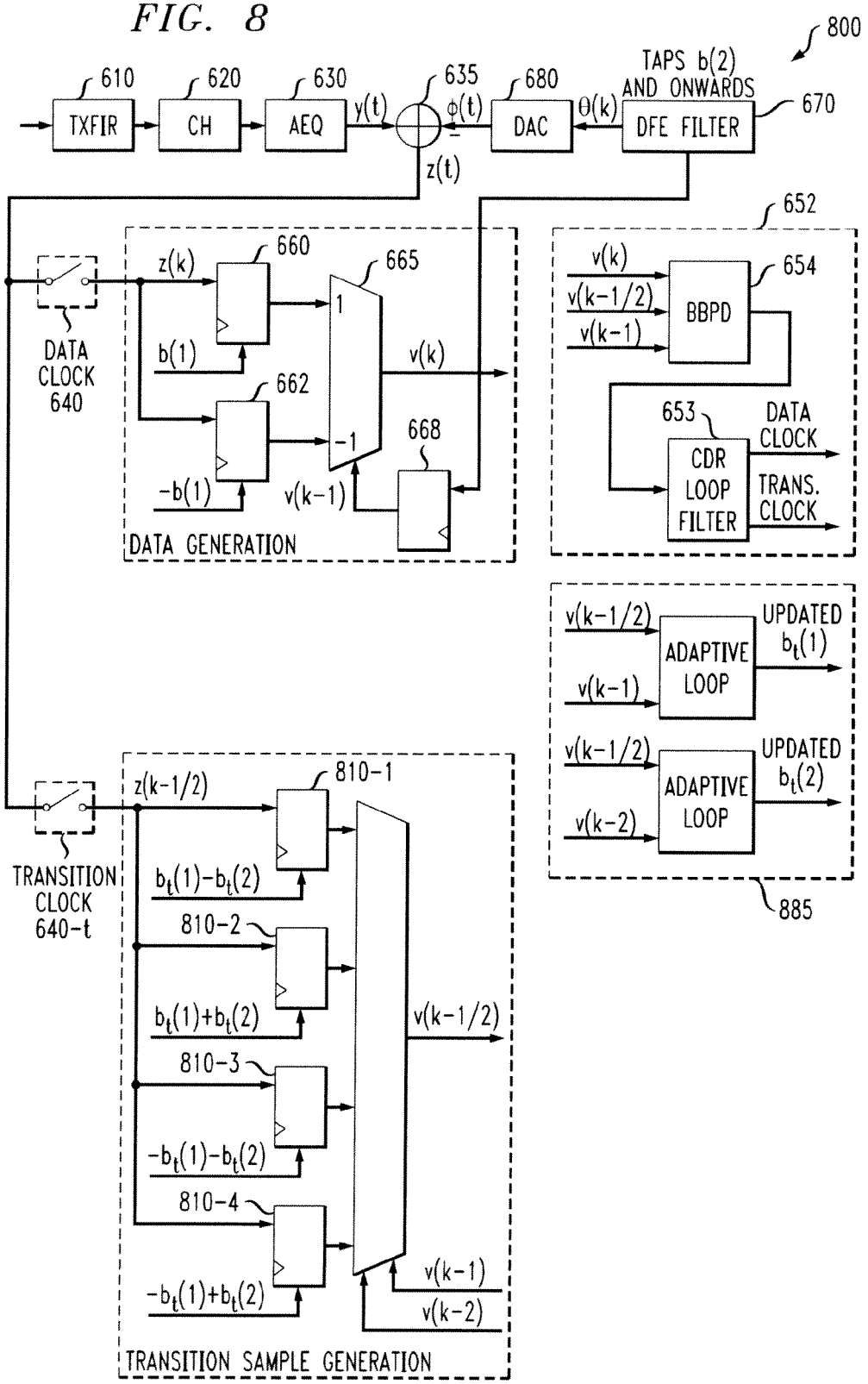
FIG. 8 illustrates a hybrid DFE architecture in accordance with the present invention that employs analog feedback and one tap loop unrolling for the data samples and two tap loop unrolling for the transition samples.

FIG. 8 illustrates a hybrid DFE architecture 800 in accordance with the present invention that employs analog feedback and one tap loop unrolling for the data samples and two tap loop unrolling for the transition samples. In this manner, the transition sample generation is more elaborate using an extra term dependent on v(k−2) with an independent second transition coefficient $b_t(2)$. It is noted that the like-numbered elements in FIG. 8 operate in a similar manner to the corresponding elements of FIG. 6. The transition sample is obtained as follows:

$$v(k-\tfrac{1}{2})=\text{sgn}([z(k-\tfrac{1}{2})-b_t(1)v(k-1)-b_t(2)v(k-2)]) \quad (17)$$

The adaptation equations are:

$$b_t(1,k+1)=b_t(1,k)-2\mu_t v(k-\tfrac{1}{2})v(k-1) \quad (18)$$

$$b_t(2,k+1)=b_t(2,k)-2\mu_t v(k-\tfrac{1}{2})v(k-2) \quad (19)$$

Both the transition coefficients $b_t(1)$ and $b_t(2)$ may be optimally adapted when $v(k)\neq v(k-1)$ (data transition) or some other advantageous data condition.

FIG. 8 assumes that $b_t(1)$ and $b_t(2)$ based transition sample generation is based fully on the use of latches. Therefore, four latches 810-1 through 810-4 based on the (v(k−1), v(k−2)) states are required. Since $v(k-\tfrac{1}{2})$ is not fed back into the main data loop, pipelining can be considered to relax settling time of $z(k-\tfrac{1}{2})$ with respect to v(k−1) as long as pipelined version of v(k), v(k−1) are properly aligned with a pipleined $v(k-\tfrac{1}{2})$ for the CDR loop.

An adaptive loop 885 uses equations 18 and 19 to generate the updated transition thresholds $b_t(1)$ and $b_t(2)$ based on the data samples v(k−1), v(k−2) and $v(k-\tfrac{1}{2})$.

Extension to More Transition Taps With Data Conditioning

The transition sample generation for a M taps can be obtained as follows:

$$v(k-1/2) = \text{sgn}\left(\left[z(k-1/2) - \sum_{m=1}^{M} b_t(m)v(k-m)\right]\right) \quad (20)$$

The adaptation equation for the mth tap is $$b_t(m,k+1)=b_t(m,k)-2\mu_t v(k-\tfrac{1}{2})v(k-m) \quad (21)$$

To implement the calculation of $v(k-\tfrac{1}{2})$ in an unrolled fashion for a M tap transition DFE requires $2^M$ latches with the appropriate threshsolds dervied from the signed combinations of $b_t(m)$. It may be possible depending on the demands of the application and corresponding performance required to use fewer transition taps and power down hardware no longer necessary to support the full number of taps.

Quasi-Linear DFE Phase Detector

Quasi-linear phase detectors (QLPD) (see, e.g., Y. Choi et al, "Jitter Transfer Analysis of Tracked Oversampling Techniques for Multigigabit Clock and Data Recovery," IEEE Transactions on Circuits and Systems, 775-783 (November 2003)) employ additional clocks and require the use of additional DFE samples. For example, "early" and "late" clocks and corresponding samples may be required in addition to the data and transition clocks and samples. The transition clock is $$\frac{T}{2}$$

earlier than the main data clock. The "early" clock is typically $$\frac{3T}{4}$$

earlier than the transition clock and the "late" clock is typically $$\frac{T}{4}$$

earlier than the data clock.

U.S. patent application Ser. No. 11/356,691, filed Feb. 17, 2006, entitled "Method and Apparatus For Generating One or More Clock Signals for a Decision Feedback Equalizer Using DFE Detected Data," generates additional DFE samples, for example, for "early" and "late" clocks, has been considered based on the use of one method to generate these samples without optimizing the DFE coefficient or threshold in the process of generating these samples. Also, no adaptation methodology is provided for updating the "early" and "late" DFE coefficients. One aspect of the present invention provides a more optimal solution for generating these samples and a method for adapting them. Consider still the hybrid DFE architecture as in FIG. 6 or 8 for the data path. Additional early and late samples are now generated:

$$z(k-3/4) = z\left(kT + \tau - \frac{3T}{4}\right)$$

$$z(k-1/4) = z\left(kT + \tau - \frac{T}{4}\right)$$

and must obtain the corresponding signed DFE early and late samples. Early and late DFE coefficients $b_e(m)$ and $b_l(m)$ are defined which can be independently chosen from the data coefficients $b(m)$ and the transition coefficients $b_t(m)$. The early/late samples used for the CDR update are:

$$v(k-3/4) = \text{sgn}\left(\left[z(k-3/4) - \sum_{m=1}^{M} b_e(m)v(k-m)\right]\right) \quad (22)$$

$$v(k-1/4) = \text{sgn}\left(\left[z(k-1/4) - \sum_{m=1}^{M} b_l(m)v(k-m)\right]\right) \quad (23)$$

Considering the ideal values at the early/late samples to be $v_{id}(k-3/4)=\gamma v(k-1)$ and $v_{id}(k-1/4)=\gamma v(k)$, we have for the early/late samples, errors:

$$e(k-3/4) = \text{sgn}\left(\left[z(k-3/4) - \sum_{m=1}^{M} b_e(m)v(k-m) - \gamma v(k-1)\right]\right) \quad (24)$$

$$e(k-1/4) = \text{sgn}\left(\left[z(k-1/4) - \sum_{m=1}^{M} b_l(m)v(k-m) - \gamma v(k)\right]\right) \quad (25)$$

Note that although $b_e$ and $b_l$ are assumed to consist of M taps each, the number of taps for the data, transition, early, or late coefficients can be independently chosen. The early/late coefficients can be adapted as follows:

$$b_e(m,k+1)=b_e(m,k)-2\mu_e e(k-3/4)v(k-m) \quad (26)$$

$$b_l(m,k+1)=b_e(m,k)-2\mu_l e(k-1/4)v(k-m) \quad (27)$$

where only the transition data is conditioned.

Figure 9:
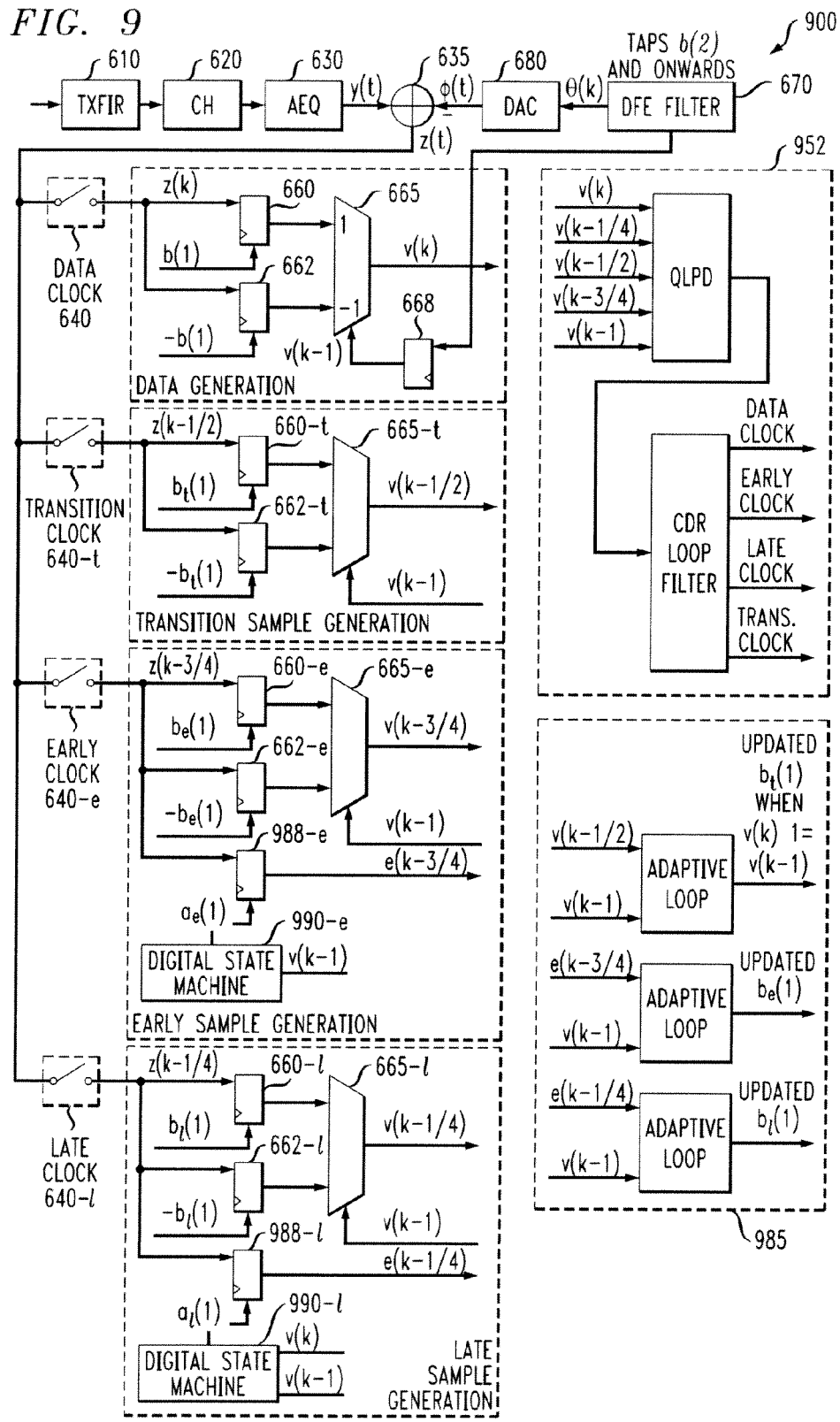
FIG. 9 illustrates a hybrid DFE architecture in accordance with the present invention that employs analog feedback and loop unrolling for exemplary data, transition, early and late samples.

FIG. 9 illustrates a hybrid DFE architecture 900 in accordance with the present invention that employs analog feedback and loop unrolling for exemplary data, transition, early and late samples. It is noted that the like-numbered elements in FIG. 9 operate in a similar manner to the corresponding elements of FIGS. 6 and 7. As shown in FIG. 9, the exemplary CDR 952 is comprised of a digital loop filter (CDR loop filter and clock generation) and a quasi linear phase detector. The CDR 952 generates the data, transition, early and late clocks.

In FIG. 9, one early/late $b_e(1),b_l(1)$ is considered to generate the early/late samples. In this case, the error equations become $$e(k-3/4)=\text{sgn}([z(k-3/4)-b_e(1)v(k-1)-\gamma v(k-1)]) \quad (28)$$

$$e(k-1/4)=\text{sgn}([z(k-1/4)-b_l(1)v(k-1)-\gamma v(k)]) \quad (29)$$

and the error equations can be written more succinctly as:

$$e(k-3/4)=\text{sgn}([z(k-3/4)-\alpha_e]) \quad (30)$$

$$e(k-1/4)=\text{sgn}([z(k-1/4)-\alpha_l]) \quad (31)$$

where $\alpha_e=b_e(1)v(k-1)-\gamma v(k-1)$ and $\alpha_l=b_l(1)v(k-1)-\gamma v(k)$, as shown in FIG. 9. Note that additional samples can be considered beyond the transition, early, late samples at the expense of more complexity.

An adaptive loop 985 generates the updated transition thresholds $b_t(1)$, $b_e(1)$ and $b_l(1)$ based on the data samples $v(k-\frac{1}{4})$, $v(k-\frac{1}{2})$, $v(k-\frac{3}{4})$ and $v(k-1)$. As shown in FIG. 9, the exemplary hybrid DFE architecture 900 comprises two digital state machines 990-e and 990-l that sets the threshold of the respective lower latches 988-e and 988-l accordingly, depending on the value of $v(k-1)$.

POSSIBLE VARIATIONS TO ASPECTS OF THE INVENTION

The CDR digital loop filter can be decimated or decimated in a parallel sampled fashion, as described in U.S. patent application Ser. No. 10/965,138, entitled "Parallel Sampled Multi Stage Decimated Digital Loop Filter for Clock/Data Recovery," incorporated by reference herein. Using a parallel sampled approach will mean more complexity but is otherwise a straightforward extension of the present invention. The loop filter may or may not incorporate look ahead techniques, as described in U.S. patent application Ser. No. 11/029,977, entitled "Look-Ahead Digital Loop Filter for Clock and Data Recovery," incorporated by reference herein. While the examples shown herein are for a one tap unrolling for the data path, the disclosed architectures can be extended with more complexity to additional unrolled DFE taps for the main data path, as would be apparent to a person of ordinary skill in the art. The sample generation and adaptation architectures shown here were with an hybrid DFE architecture employing unrolling for the first data tap. The clock recovery samples can be generated even when a full analog DFE loop is used for the main data path.

Figure 10:
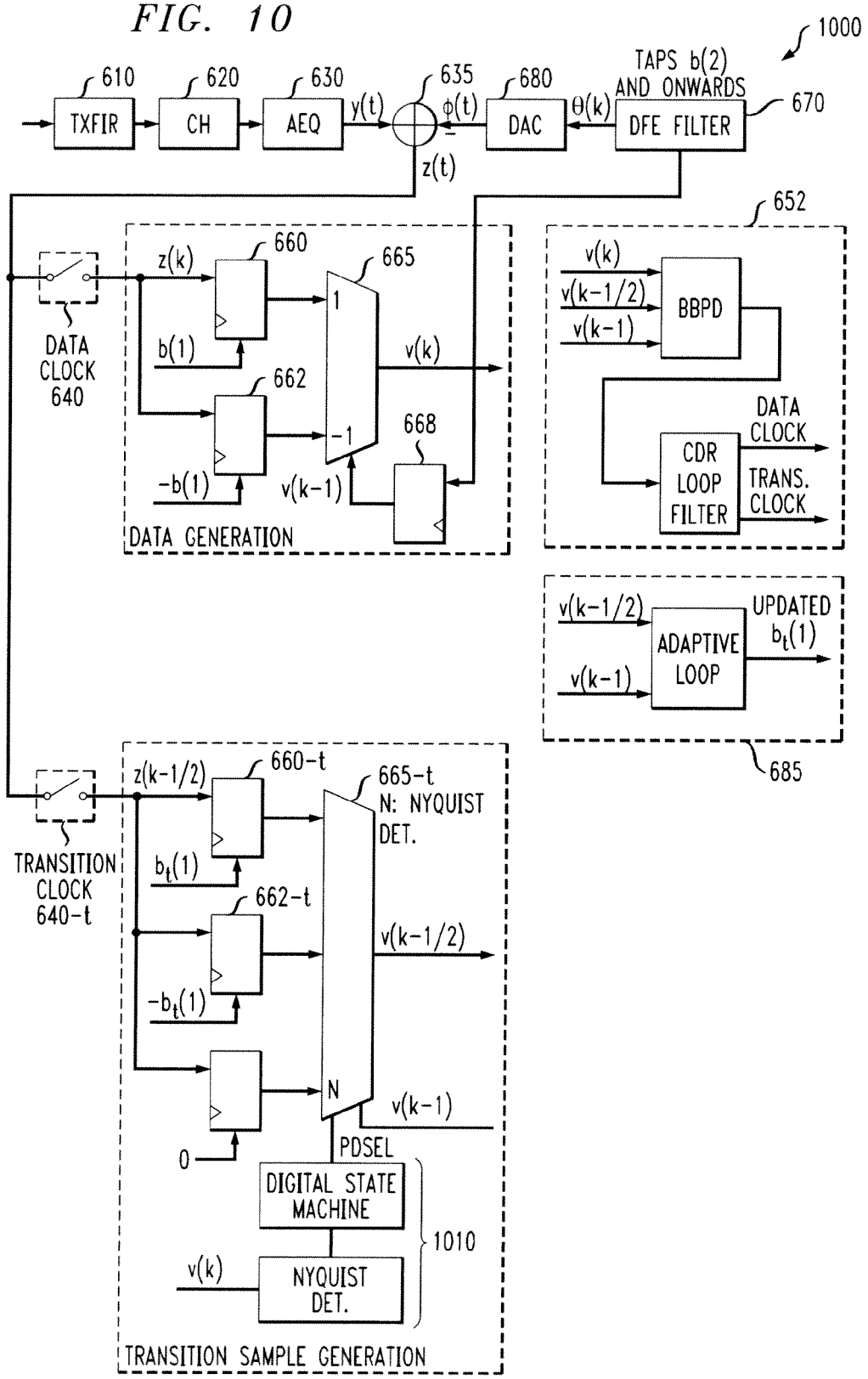
FIG. 10 illustrates a hybrid DFE architecture in accordance with the present invention that employs pattern qualification.

In further variations, the architectures used here could optionally be combined with techniques such pattern qualification, as described in U.S. patent application Ser. No. 11/541,498, entitled, "Method and Apparatus for Generating One or More Clock Signals for a Decision-Feedback Equalizer Using DFE Detected Data In The Presence Of An Adverse Pattern," incorporated by reference herein. One example of this is shown in FIG. 10, where an additional Nyquist detection/qualification 1010 occurs when a pattern detector detects the presence of a Nyquist signal. It is noted that the like-numbered elements in FIG. 10 operate in a similar manner to the corresponding elements of FIG. 6. When this happens, it may be advantageous to make transition decisions not based on the transition coefficient threshold $b_t(1)$ but based on using a zero threshold.

The architectures used here can also be considered with "quasi-non-linear" phase detectors. For example, the "early" and "late" clocks need not be uniformly spaced at $$\frac{3T}{4} \text{ and } \frac{T}{4}$$

with respect to the data clock.

The above variations can be considered in combination with the non-conditioned data case as well as the conditioned data case.

The invention is described in terms of unrolled generation of the transition, late, early, or additional samples (as opposed to the main data samples). The use of an analog summing node in conjunction with unrolling can be considered for the non-data samples can be used. For example, the use of a local analog summing node for the $b_t(2)v(k-2)$ can be employed to minimize the number of latches.

CONCLUSION

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for detecting data in a receiver employing decision-feedback equalization, comprising:
    sampling a received signal using a data clock and a transition clock to generate a data sample signal and a transition sample signal;
    obtaining a DFE correction for each of said data sample and transition sample signals to generate DFE detected data and DFE transition data, wherein said DFE correction is based on a prior value of one or more of said DFE detected data and said DFE transition data; and
    adapting one or more coefficients used for said DFE correction for said transition sample signals using said DFE transition data.

2. The method of claim 1, wherein said adapting step further comprises the step of precomputation for said DFE correction for said transition sample signals.

3. The method of claim 1, wherein said adapting step is conditioned upon a data transition.

4. The method of claim 1, wherein said adapting step is not conditioned upon a data transition.

5. The method of claim 1, wherein said adapting step further comprises the step of computing said one or more coefficients used for said DFE correction for said transition sample signals as a function of a prior value of said transition sample signals.

6. The method of claim 5, wherein said one or more transition coefficients are computed by one or more digital state machines.

7. The method of claim 1, further comprising the steps of:
    sampling said received signal using said data and transition clocks and at least one additional clock to generate said data and transition sample signals and at least one additional sample signal; and
    obtaining a DFE correction for each of said data, transition and at least one additional samples to generate said DFE detected data, said DFE transition data and at least one additional DFE data.

8. The method of claim 7, further comprising the step of adapting one or more coefficients used for said DFE correction for said at least one additional sample signal using said at least one additional DFE data.

9. The method of claim 1, further comprising the step of adapting multi-phase taps associated with multi-phase DFE sampling clocks using one or more of DFE detected data and DFE multi-phase errors.

10. The method of claim 1, further comprising the step of altering one or more parameters of said adapting step upon detection of a predefined pattern.

11. The method of claim 1, further comprising the step of altering an adaptation rate of said adapting step upon detection of a predefined pattern.

12. The method of claim 1, further comprising the step of suppressing said adapting step upon detection of a predefined pattern.

13. A receiver employing decision-feedback equalization, comprising:
    a plurality of switches configured to sample a received signal using a data clock and a transition clock to generate a data sample signal and a transition sample signal;
    at least one decision-feedback equalization (DFE) block configured to generate a DFE correction for each of said data sample and transition sample signals to generate DFE detected data and DFE transition data, wherein said DFE correction is based on a prior value of one or more of said DFE detected data and said DFE transition data; and
    an adaptive loop for adapting one or more coefficients used for said DFE correction for said transition sample signals using said DFE transition data.

14. The receiver of claim 13, wherein said adaptive loop performs a precomputation for said DFE correction for said transition sample signals.

15. The receiver of claim 13, wherein said adaptive loop conditions said adaptation upon a data transition.

16. The receiver of claim 13, wherein said adaptive loop does not condition said adaptation upon a data transition.

17. The receiver of claim 13, wherein said adaptive loop computes said one or more coefficients used for said DFE correction for said transition sample signals as a function of a prior value of said transition sample signals.

18. The receiver of claim 13, wherein said adaptive loop comprises one or more digital state machines.

19. The receiver of claim 13, wherein said adaptive loop adapts multi-phase taps associated with multi-phase DFE sampling clocks using one or more of DFE detected data and DFE multi-phase errors.

20. The receiver of claim 13, wherein one or more parameters of said adaptive loop are altered upon detection of a predefined pattern.

21. The receiver of claim 13, wherein an adaptation rate of said adaptive loop is altered upon detection of a predefined pattern.

22. The receiver of claim 13, wherein said adaptive loop is suppressed upon detection of a predefined pattern.

* * * * *